(12) United States Patent
Sahlberg et al.

(10) Patent No.: US 9,276,899 B2
(45) Date of Patent: Mar. 1, 2016

(54) WORKLOAD BALANCING BETWEEN NODES IN A CLUSTER AS REQUIRED BY ALLOCATIONS OF IP ADDRESSES WITHIN A CLUSTER

(71) Applicant: INTERNATION BUSINESS MACHINE, Armonk, NY (US)

(72) Inventors: Leif R. Sahlberg, Kariong (AU); Martin Schwenke, Barton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/848,847

(22) Filed: Mar. 22, 2013

(65) Prior Publication Data
US 2013/0326066 A1    Dec. 5, 2013

Related U.S. Application Data

(63) Continuation of application No. 13/487,538, filed on Jun. 4, 2012.

(51) Int. Cl.
*G06F 15/173*    (2006.01)
*H04L 29/12*    (2006.01)
*H04L 29/08*    (2006.01)

(52) U.S. Cl.
CPC ........ *H04L 61/2007* (2013.01); *H04L 61/2061* (2013.01); *H04L 67/1023* (2013.01)

(58) Field of Classification Search
CPC ............ H04L 61/2007; H04L 67/1002; H04L 67/1008; H04L 67/1021; H04L 67/1097; G06F 15/173
USPC .......................................................... 709/226
See application file for complete search history.

(56) References Cited

U.S. PATENT DOCUMENTS

| | | | |
|---|---|---|---|
| 6,178,455 B1 * | 1/2001 | Schutte | H04L 29/06 709/226 |
| 6,430,618 B1 * | 8/2002 | Karger et al. | 709/225 |
| 6,865,601 B1 * | 3/2005 | Cherkasova | H04L 29/06 709/202 |
| 6,954,784 B2 * | 10/2005 | Aiken, Jr. | H04L 29/06 709/220 |
| 6,993,034 B1 * | 1/2006 | Block | H04L 29/12783 370/390 |
| 7,020,698 B2 * | 3/2006 | Andrews et al. | 709/223 |
| 7,155,515 B1 * | 12/2006 | Brown et al. | 709/226 |
| 7,219,160 B1 * | 5/2007 | Buchsbaum et al. | 709/242 |
| 7,240,106 B2 * | 7/2007 | Cochran et al. | 709/222 |
| 7,346,686 B2 * | 3/2008 | Albert et al. | 709/226 |
| 7,395,335 B2 * | 7/2008 | Brown et al. | 709/226 |

(Continued)

OTHER PUBLICATIONS

Marcel Waldvogel, Fast Longest Prefix Matching: Algorithm, Analysis, and Applications, 2000 Swiss Federal Institute of Technology Zurich, Diss. ETH No. 13266, 141.*

*Primary Examiner* — Joseph E Avellino
*Assistant Examiner* — Binod J Kunwar
(74) *Attorney, Agent, or Firm* — J. B. Kraft; Steven L. Bennett

(57) ABSTRACT

Balancing workload distributed between nodes in a cluster through allocations of IP addresses by determining, for each node, an imbalance metric for each possible pairing of the plurality of an IP address assignable to the node based upon the distances between the IP addresses in each pairing and selectively distributing a plurality of IP addresses between the nodes in a cluster based upon minimizing the sum of the imbalance metrics of the IP addresses for each of the nodes in the cluster resulting from the selected distribution.

7 Claims, 4 Drawing Sheets

(56) References Cited

U.S. PATENT DOCUMENTS

| | | | |
|---|---|---|---|
| 7,457,854 B2* | 11/2008 | Trisno et al. | 709/220 |
| 7,747,720 B2* | 6/2010 | Toebes | H04L 67/1021 370/401 |
| 7,975,039 B2* | 7/2011 | Popescu et al. | 709/223 |
| 8,015,298 B2* | 9/2011 | Yevmenkin | H04L 67/1002 709/202 |
| 8,280,998 B2* | 10/2012 | Joshi | H04L 29/12792 709/217 |
| 8,489,750 B2* | 7/2013 | Yevmenkin | H04L 29/12405 709/227 |
| 2002/0129086 A1* | 9/2002 | Garcia-Luna-Aceves | H04L 45/00 709/200 |
| 2003/0126200 A1* | 7/2003 | Wolff | G06F 9/52 709/203 |
| 2003/0236793 A1* | 12/2003 | Karlsson | 707/101 |
| 2003/0236968 A1* | 12/2003 | Basu et al. | 712/225 |
| 2004/0059830 A1* | 3/2004 | Brown | H04L 41/0893 709/238 |
| 2006/0161661 A1* | 7/2006 | Johnson et al. | 709/226 |
| 2006/0268742 A1* | 11/2006 | Chu et al. | 370/254 |
| 2009/0292802 A1* | 11/2009 | Popescu | H04L 12/24 709/223 |
| 2010/0250668 A1* | 9/2010 | Toebes | H04L 67/1021 709/203 |
| 2013/0268653 A1* | 10/2013 | Deng et al. | 709/224 |

* cited by examiner

WORKLOAD BALANCING BETWEEN NODES IN A CLUSTER AS REQUIRED BY ALLOCATIONS OF IP ADDRESSES WITHIN A CLUSTER

TECHNICAL FIELD

The present invention relates to clusters of nodes, wherein each node is a computer system, and more particularly for workload balancing of IP addresses allocated between the nodes in the cluster.

BACKGROUND OF RELATED ART

In the input of work to a cluster of nodes from network client sources, the cluster, whether it be real or virtual, is seen by the requesting clients as a single machine even though it is made up of several individual computers or servers, each being a cluster node. The cluster controlling server distributes the IP addresses (i.e., the service addresses of the distributed workload) across all of the nodes in Network Node Balancing wherein input from clients are shared among a plurality or even all of the nodes. Each node may have its own copy of an application, the work of which is distributed and share a database common to the cluster. Network load balancing is particularly significant in high demand Web sites on the Internet. However, Network Workload Balancing, particularly that of the present invention, is just as applicable to NAS services (CIFS or NFS) as well as, for example, FPT, HTTP and iSCSI. Such balancing distributes the current workload as evenly as possible across all of the cluster nodes. Each of the nodes may maintain its own copy of the network site so that if one of the nodes goes inactive, its workload may be redistributed to the other nodes in the cluster. Similarly, if the workload to the cluster increases, more nodes may be added to the cluster and workload from the existing nodes redistributed to the new nodes.

SUMMARY OF THE PRESENT INVENTION

It is noted that in the distribution or redistribution of workload from NIP addresses among M nodes in a cluster, the total number of possible solutions would be: M to the power of N. This would be an exhaustive determination for the optimal distribution of workload when M and N are large.

The present invention provides a simplified solution to workload balancing, of IP addresses allocated to the cluster from a plurality of client network sources that is based upon determinations of distances between IP addresses of work allocated to the cluster.

It should be noted that in current cluster technologies, such as cluster quorum wherein each node has a copy of the quorum database, longer distance clustering dispersement of nodes has become more practical. The present invention does provide a workload cluster node balancing optimization related to the distances between IP addresses allocated to the respective nodes in the cluster.

Accordingly, the present invention provides an implementation for balancing workload required to be allocated between the nodes in the cluster related to workload requests from clients via the network, determining, for each node in the cluster, an imbalance metric for each possible pairing of each IP address allocatable to the node based upon the distances between said IP addresses in each pairing and selectively allocating the IP addresses to the nodes in the cluster based upon minimizing the sum of the imbalance metrics of the nodes in the cluster resulting from the selected allocation of IP addresses.

The imbalance metric is more specifically determined by squaring the distances of all paired IP addresses allocated to the node and calculating the sum of all of said pairings for said node. In this calculation, the distance between a pair of IP addresses is the longest prefix, taken bitwise, common to each of the pair of addresses.

In accordance with a further aspect of this invention, IP addresses are dynamically reallocated from node to node is a result of changes to the sum of the imbalance metric as IP address inputs to the cluster change. In particular, responsive to newly allocating, an IP address to a node in the cluster, the increase in the imbalance metric for the node is determined by squaring the distances of the newly allocated IP address paired with each IP address allocated to the node, then calculating the sum of all of these squared distances of pairings for the node and adding the calculated sum to the existing imbalance metric of the node.

On the other hand, if a node in the cluster goes off-line, its IP addresses are reallocated to one of the remaining nodes in the cluster. This further includes determining the increase in the imbalance metric resulting from the reallocating the IP address to each remaining node in the cluster and reallocating the IP address to the node with the least increase of its imbalance metric.

In accordance with another aspect of this invention, responsive to removing an IP address from a node in the cluster, the decrease in the imbalance metric for the node is calculated by squaring the distances of the removed IP address paired with each remaining IP address allocated to the node, calculating the sum of all squared distances of the pairings for the node and then decreasing the calculated sum from the existing imbalance metric of the node.

Similarly, a removed address may be reallocated to another node in the cluster by determining the increase in the imbalance metric resulting from the reallocation of the removed address to each remaining node in the cluster and reallocating the IP address to the node with the least increase of its imbalance metric with respect to the decrease in the imbalance metric of the node from which the address is being removed.

BRIEF DESCRIPTION OF THE DRAWINGS

The present invention will be better understood and its numerous objects and advantages will become more apparent to those skilled in the art with reference to the following drawings, in conjunction with the accompanying specification, in which.

DETAILED DESCRIPTION OF THE PREFERRED EMBODIMENT

Figure 1:
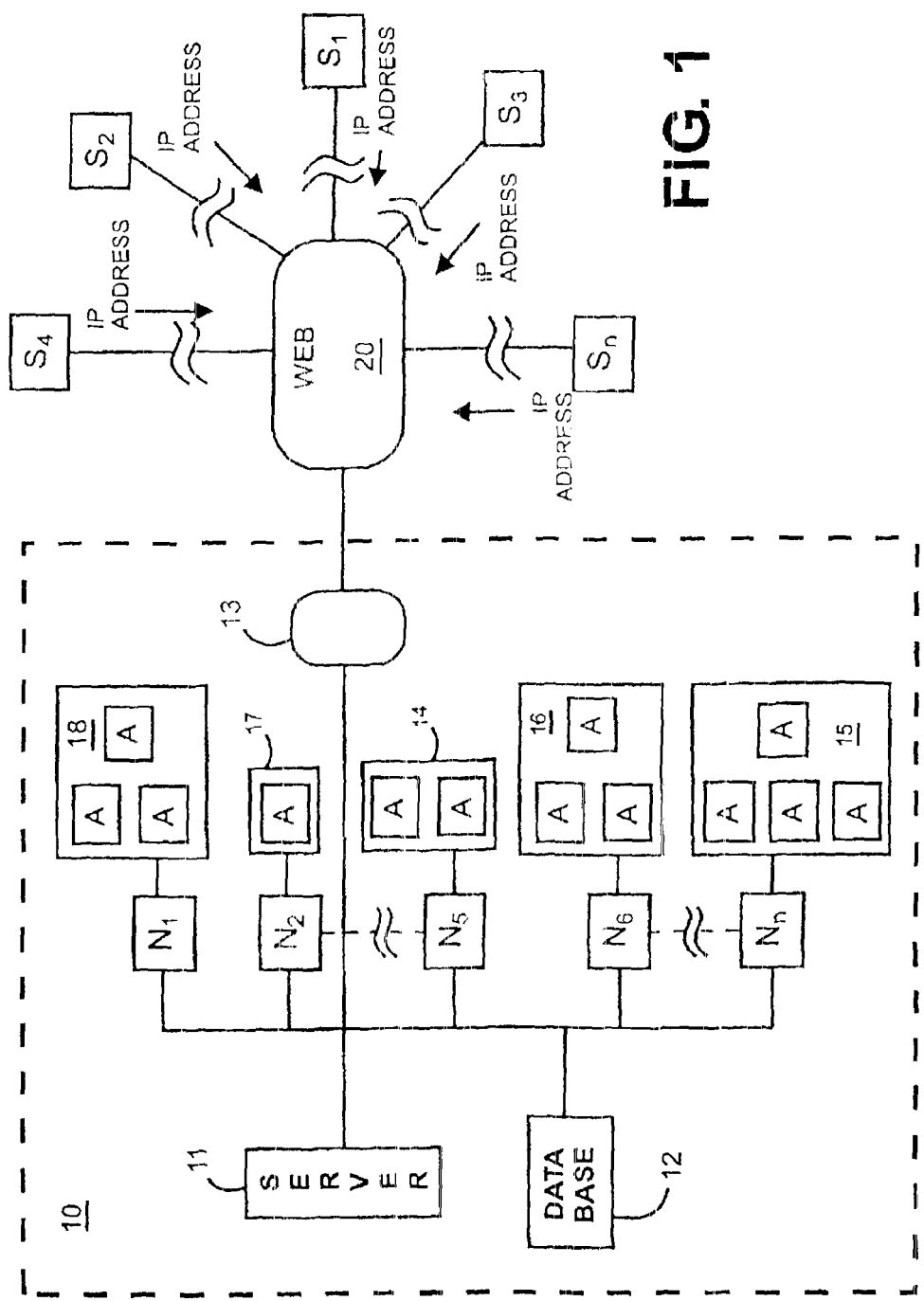
FIG. 1 is a generalized diagrammatic view of a network portion, including a cluster of nodes and client sources on the network providing workload input to the cluster.

Referring to FIG. 1, there is shown a generalized diagrammatic view of a network portion, showing the relationship of cluster 10 of nodes N1, N2, . . . N5, N6, . . . Nn. The distribution of workload to be subsequently described may be controlled by cluster server 11. Alternately, any of the computer systems of nodes N1 . . . Nn may provide the server function on which the workload balancing programs of this invention may be carried out. Nodes N1 . . . Nn also share a common database 12.

Clients S1, S2, S3, S4 . . . Sn provide workload, over network 20, that may be the World Wide Web through an appropriate gateway 13 to cluster 10 that is seen by the clients S1 . . . Sn as a single address.

Each node N1 through Nn respectively has a set 14, 15, 16, 17 and 18 of addresses "A's" allocated to node.

The present invention provides its method and program for workload balancing (to be subsequently described). The invention is based upon workload balancing that relates the distances between the IP addresses of work assigned or allocated to selected nodes in the cluster. As will be hereinafter described in greater detail, allocation or reallocation of addresses is processed optimally when a node goes offline, a "fail over", and its set of IP addresses are distributed to remaining nodes in the cluster; or when a node comes online, "fail back", and a set of IP addresses are reallocated back to the returning node; or when new IP addresses are to be allocated to nodes in a cluster.

Figure 2:
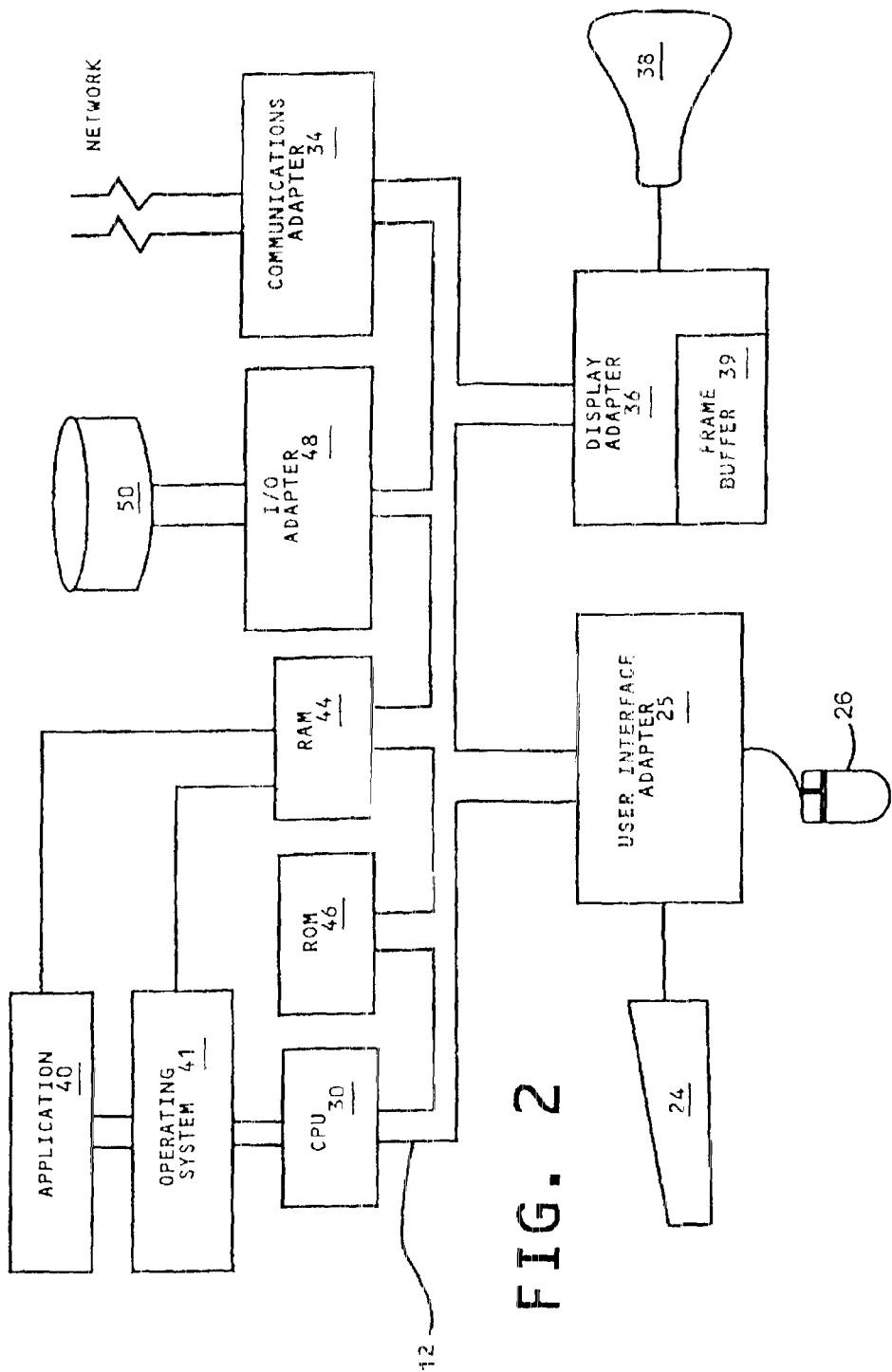
FIG. 2 is an illustrative diagrammatic view of a control processor that may be used for any of the nodes in the cluster of FIG. 1, as well as for the control servers for the cluster.

With respect to FIG. 2, there is shown an illustrative diagrammatic view of a control processor that may be used for any of the nodes in the cluster of FIG. 1, as well as for the control servers for the cluster in FIG. 1. A central processing unit (CPU) 30, such as one of the microprocessors or workstations, e.g. System p series available from International Business Machines Corporation (IBM) is provided and interconnected to various other components by system bus 12. An operating system (OS) 41 runs on CPU 30, provides control and is used to coordinate the function of the various components of FIG. 2. Operating system 41 may be one of the commercially available operating systems. Application programs 40, controlled by the system, are moved into and out of the main memory Random Access Memory (RAM) 44. These programming applications may be used to implement functions of the present invention in balancing cluster node workloads.

However, it is preferable that the programs used to implement the present invention be stored in a database 50 connected to CPU 30 and RAM 44 via bus 12. ROM 46 includes the Basic Input/Output System (BIOS) that controls the basic computer functions of the computer. RAM 44, storage adapter 48 and communications adapter 23 are also interconnected to system bus 12. Storage adapter 48 communicates with the database 50. Communications adapter 34 interconnects bus 12 with the outside or the cluster networks. I/O devices are also connected to system bus 12 via user interface adapter 25. Keyboard 24 and mouse 26 may be connected to bus 12 through user interface adapter 25. Display buffer 39 in display adapter 36 supports display 38.

Figure 3:
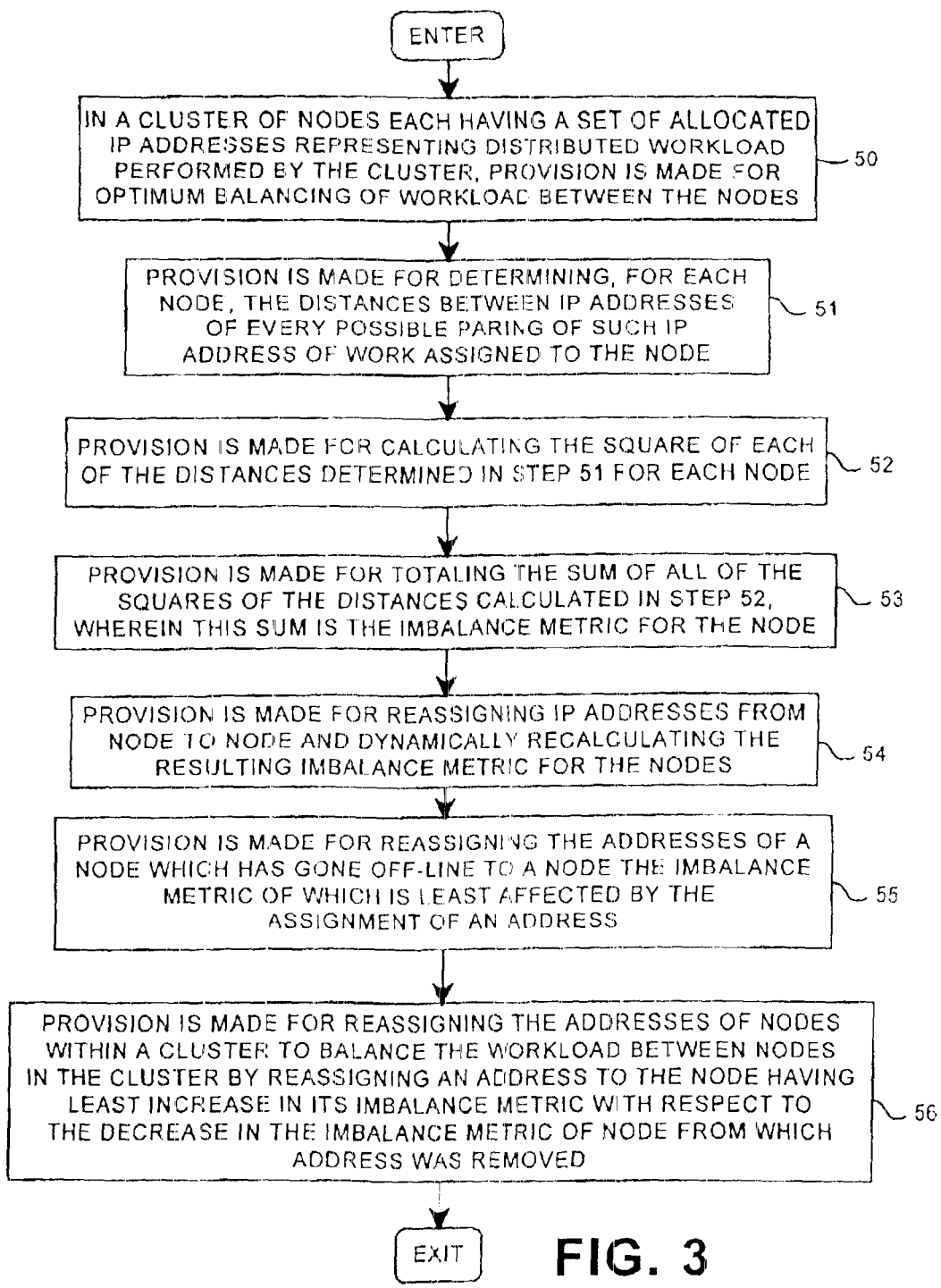
FIG. 3 is a general flowchart of a program set up to implement the present invention for balancing workload between nodes in a cluster.

FIG. 3 is a general flowchart of an illustrative program set up to implement the present invention for the optimum balancing of workload between the nodes in a cluster. Provision is made for such optimum balancing in a cluster of nodes connected via a network to a plurality of client sources of work. Provision is made for determining, for each node, the distances between the IP addresses of every possible pairing of such IP addresses of work allocated to the node, step 51. Provision is made, step 52, for calculating the square of each of the distances determined in step 51 for each node. Provision is made for totaling the sum of all of the squares of the distances calculated in step 52 wherein this sum is the imbalance metric of the node, step 53. Provision is made for reallocating the IP addresses from node to node and dynamically recalculating the resulting imbalance metric for the nodes, step 54. Provision is made for reallocating the addresses of a node that has gone off-line to a node the imbalance metric of which is least affected by the reallocating of in address, step 55. Provision is made for reallocating the addresses of nodes within a cluster to balance the workload between nodes in the cluster by allocating an address to the node having the least increase in its imbalance metric with respect to the decrease in the imbalance metric of the node from which the IP address was removed, step 56.

The IP address distances are thus used to determine the costs of assigning addresses to the same nodes. This IP address distance is based upon the longest common prefix of a pair of addresses taken bitwise. Therefore, this address distance calculation is applicable to most types of network addresses (including IPv4, IPv6 and IPX). The cost is measured as the imbalance metric for each node and is calculated as the sum of the squares of the address distance between each pair of addresses on the node. The algorithm that will subsequently be detailed is the Longest Common Prefix Squared (LCP2). In effect, the imbalance metric of a cluster may be defined as the maximum cost associated with its nodes. A cluster with a high imbalance metric is, thus, less balanced than a cluster with a lower imbalance metric.

When adding an IP address to a node, the incremental cost is calculated as the sum of the squares of the address distance between the IP address being added and each IP address already on the node. Likewise, when removing an IP address from a node, the decremental cost is calculated as the sum of the squares of the address distance between the IP address being removed and each IP address remaining on the node.

Figure 4:
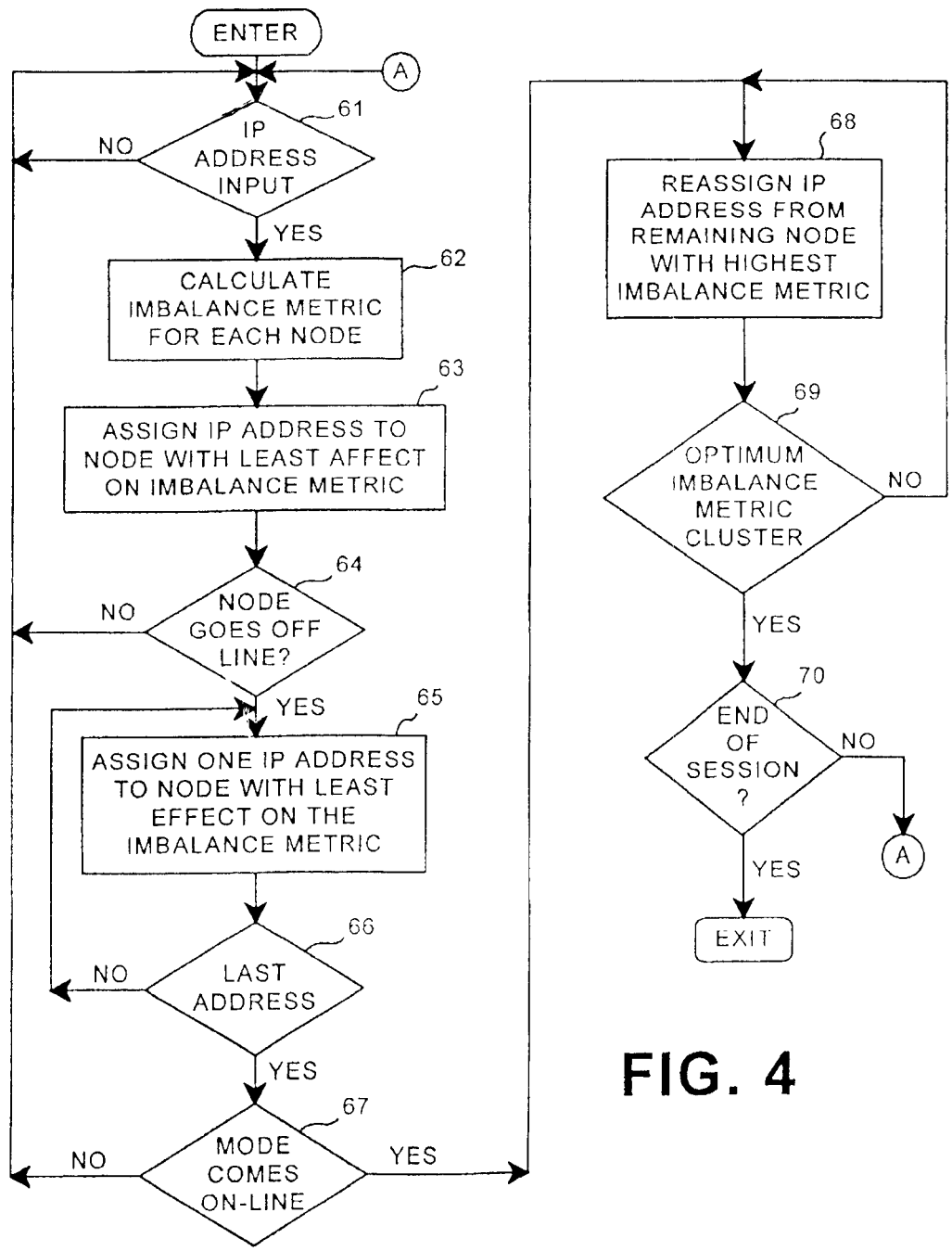
FIG. 4 is a flowchart of an illustrative run of the program set up in FIG. 3.

A simple illustrative example of a run of the process set up in FIG. 3 is described with respect to the flowchart of FIG. 4. When running the algorithm, the affects, on the imbalance metrics of assigning IP addresses, are weighed in making the assignment. Then, "fail over" effect of reallocating the IP addresses of a node that goes off-line. Its IP addresses are moved to a pool of unallocated IP addresses. The incremental cost of adding each unallocated address to each on-line node is calculated. The algorithm ensures that the IP address/node combination with the lowest incremental cost is performed. This calculation is repeated until there are no unassigned addresses or no further assignment is possible.

Next, the fail-back effect when a node returns to on-line status first sets such a node as a target node and all of the other nodes in the cluster are source nodes of IP addresses for possible reallocation. Then the source node with the highest imbalance metric is selected and the decremental cost of removing each IP address is calculated. The incremental cost of moving each address from this source node to each target node and the resulting imbalance metric for the target node are calculated. The moving of IP addresses from a source to a target node is desirable if the resulting imbalance metric of the target node will be less than the initial imbalance metric of the source node. A reduction in the imbalance metric of the cluster is the object of the process. Of the possible desirable moves of IP addresses, the move with the lowest imbalance of the target node is selected. If there are no further desirable moves from a source node, the iteration involving a selected source is terminated, another source node is selected and the calculation for IP address moves is repeated.

An illustrative run is now described with respect to FIG. 4. In the routine operation of the cluster, a determination is made as to whether there is an IP address input to the cluster address 61. If Yes, the imbalance metric for each cluster node is calculated as previously described in step 62 and the IP address is assigned to the node, wherein there would be the least effect on the imbalance metric, step 63. Such routine assignment of IP addresses continues until a node in the cluster goes off-line (node fail-out), as indicated by a Yes decision in step 64, i.e. if the decision is No, the process is branched back to step 61 wherein the routine processing of IP addresses is continued. However, if Yes, a node goes off-line, then a first IP address from the off-line node is assigned to the node with the least effect on the imbalance metric, step 65, as previously described. This is continued with each next address in the off-line node until the last address in the node has been assigned as indicated by a Yes decision in step 66, i.e. a No decision in step 66 results in a return to step 65 wherein more node IP addresses may be reassigned. However, if Yes, routine processing of assigning IP addresses input to the cluster to appropriate nodes as indicated by a No decision in step 67 as to whether a Node has returned on-line (fail-in). However, upon a Yes decision in step 67, a node goes on-line, then, step 68, an IP address from one of the other nodes having the high imbalance metric is assigned to the new node. This is continued with each next IP address in the other nodes until an optimum imbalance metric is achieved, a Yes in decision step 69 as previously described.

At this point, or at any point in the process, if there is a determination that the session is over, Yes, step 70, the session is Exited. Otherwise, a No decision, the process is returned to step 61 via branch "A" and routine processing of input addresses is continued.

In the following sections, an example set of annotated instructions in Python object oriented language for the practice of the process of FIG. 4 is set forth.

Code snippets:

```
def ip_to_list_of_ints(ip):
    # Be lazy... but only expose errors in IPv4 addresses, since
    # they'll be more commonly used. :-)
    try:
        I = socket.inet_pton(socket.AF_INET6, ip)
    except:
        I = socket.inet_pton(socket.AF_INET, ip)
    return map(lambda x: struct.unpack:('B', x)[0], I)
def ip_distance(ip1, ip2):
    """Calculate the distance between 2 IPs.
    This is the length of the longest common prefix between the IPs.
    It is calculated by XOR-ing the 2 IPs together and counting the
    number of leading zeroes."""
    distance = 0
    fo'(o1, o2) in zip(ip_to_list_of_ints(ip1), ip_to_list_of_ints(ip2)):
        # XOR this pair of octets
        x = o1 ^ o2
        # count number leading zeroes
        if x == 0:
            distance += 8
        else:
            # bin( ) gives minimal length '0bNNN' string
            distance += (8 - (len(bin(x)) - 2))
            break
    return distance
def ip_distance_2_sum(ip, ips):
    """Calculate the IP distance for the given IP relative to IPs.
    This could be made more efficient by inserting ip_distance_2 into
    the loop in this function. However, that would result in some
    loss of clarity and also will not be necessary in a C
    implemntation."""
    sum = 0
    for i in ips:
        sum += ip_distance(ip, i) ** 2
    return sum
def imbalance_metric(ips):
    """Return the imbalance metric for a group of IPs.
    This is the sum of squares of the IP distances between each pair of IPs."""
    if len(ips) > 1:
        (h, t) = (ips[0], ips[1:])
        return ip_distance_2_sum(h, 1) + imbalance_metric(t)
self.events += 1
# Don't bother with the num_healthy stuff. It is an
# irrelevant detail.
# We just keep the allocate IPs in the current_addresses field
# of the node. This needs to readable, not efficient!
if self.deterministic_public_ips:
    # Remap everything.
    addr_list = sorted(list(self.all_public_ips))
    for (i, ip) in enumerate(addr_list):
        self.quietly_remove_ip(ip)
        # Add addresses to new node.
        pnn = i % len(self.nodes)
        self.nodes[pnn].current_addresses.add(ip)
        verbose_print("%s -> %d" % (ip, pnn))
# Remove public addresses from unhealthy nodes.
for (pnn, n) in enumerate(self.nodes):
    if not n.healthy:
```

-continued

Code snippets:

```
        verbose_print(["%s <- %d" % (ip, pnn)
                for ip in n.current_addresses])
        n.current_addresses = set( )
# If a node can't serve an assigned address then remove it.
fo'n in self.nodes:
    verbose_print(["%s <- %d" % (ip, pnn)
            for ip in n.current_addresses - n.public_addresses])
    n.current_addresses &= n.public_addresses
newly_healthy = [pnn for (pnn, n) in enumerate(self.nodes)
            if len(n.current_addresses) == 0 and n.healty]
for n in self.nodes:
    n.set_imbalance( )
# Assign as many unassigned addresses as possible. Keep
# selecting the optimal assignment unt l we don't manage to
# assign anything.
assigned = set([ip for n in self.nodes for ip in n.current_addresses])
unassigned = sorted(list(self.all_public_ips - assigned))
should_loop = True
while len(unassigned) > 0 and should_loop:
    should_loop = False
debug_begin(" CONSIDERING MOVES (UNASSIGNED)")
minnode = -1
mindsum = 0
minip = None
for ip in unassigned:
    for dstnode in range(len(self.nodes)):
        if self.nodes[dstnode].can_node_serve_ip(ip) and \
                self.nodes[dstnode].healthy:
            dstdsum = ip_distance_2_sum(ip, self.nodes[dstnode].current_addresses,
            dstimbl = self.nodes[dstnode].get_imbalance( ) + dstdsum
            debug_print(" %s -> %d [+%d]" % \
                    (ip,
                    dstnode,
                    dstimbl - self.nodes[dstnode].get_imbalance( )))
            if (minnode == -1) or (dstdsum < mindsum):
                minnode = dstnode
                minimbl = dstimbl
                mindsum = dstdsum
                minip = ip
                should_loop = True
debug_end( )
if minnode != -1:
    self.nodes[minnode].current_addresses.add(minip)
    self.nodes[minnode].set_imbalance(self.nodes[minnode].get_imbalance( ) + mindsum)
    verbose_print("%s -> %d [+%d]" % (minip, minnode, mindsum))
    unassigned.remove(minip)
for ip in unassigned:
    verbose_print("Could not find node to take over public address %s" % ip)
# Reassign as many IPs from heavily "loaded" nodes to nodes
# that are newly healthy. Loop until we fail to reassign an
# IP.
should_loop = True
while should_loop:
    should_loop = False
    if self.no_ip_failback:
        break
    ##
    if len(newly_healthy) == 0:
        return
    if self.deterministic_public_ips:
        continue
    # Get the node with the highest imbalance metric.
    srcnode = -1
    maximbl = 0
    for (pnn, n) in enumerate(self.nodes):
        b = n.get_imbalance( )
        if (srcnode == -1) or (b > maximbl):
            srcnode = pnn
            maximbl = b
# This means that all nodes had 0 or 1 addresses, so can't
# be imbalanced.
if maximbl == 0:
    break
# We'll need this a few times...
ips = self.nodes[srcnode].current_addresses
# Find an IP and destination node that best reduces imbalance.
optimum = None
```

Code snippets:

```
debug_begin(" CONSIDERING MOVES FROM %d [%d]" % (srcnode, maximbl))
for ip in ips:
    # What is this IP address costing the source node?
    srcdsum = ip_distance_2_sum(ip, ips - set([ip]))
    srcimbl = maximbl - srcdsum
    # Consider this IP address would cost each potential
    # destination node. Destination nodes are limited to
    # those that are newly healthy, since we don't want to
    # do gratuitous failover of IPs just to make minor
    # balance improvements.
    for dstnode in newly_healthy:
        if self.nodes[dstnode].can_node_serve_ip(ip) and \
           self.nodes[dstnode].healthy:
            dstdsum = ip_distance_2_sum(ip, self.nodes[dstnode].current_addresses)
            dstimbl = self.nodes[dstnode].get_imbalance( ) + dstdsum
            debug_print(" %d [%d] -> %s -> %d [+%d]" % \
                       (srcnode,
                        srcimbl - self.nodes[srcnode].get_imbalance( ),
                        ip,
                        dstnode,
                        dstimbl - self.nodes[dstnode].get_imbalance( )))
            if (dstimbl < maximbl) and (dstdsum < srcdsum):
                if optimum is None:
                    optimum = (ip, srcnode, srcimbl, dstnode, dstimbl)
                else:
                    (x, sn, si, dn, di) = optimum
                    if (srcimbl + dstimbl) < (si + di):
                        optimum = (ip, srcnode, srcimb , dstnode, dstimbl)
debug_end( )
if optimum is not None:
self.nodes[dstnode].set_imbalance(dstimbl)
verbose_print("%d [%d] -> %s -> %d [+%d]" % \
        (srcnode,
         srcimbl - ini_srcimbl,
         ip,
         dstnode,
         dstimbl - ini_dstimbl))
should_loop = True
```

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RE, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner; such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. In a cluster of nodes in a network, a method for balancing workload distributed between the nodes in the cluster in response to a workload allocation request from a source IP address to the nodes in the cluster comprising:
   determining, for each node in the cluster, an imbalance metric for each possible pairing of each source IP address allocatable to said node based upon the distances between said source IP addresses in each pairing;
   wherein said distance between a pair of source IP addresses is the longest prefix, taken bitwise, common to each of said pair of IP addresses;
   said imbalance metric being determined by squaring the distances of all paired source IP addresses between the node;
   and calculating the sum of all paired source IP addresses allocated to said node;
   and calculating the sum of all of said pairings for said node;
   and selectively allocating said source IP addresses between the nodes in cluster based upon minimizing the sum of the imbalance metrics of the nodes resulting from the source IP addresses allocated to each of the nodes in the cluster.

2. The method of claim 1, wherein said network is the World Wide Web, and said cluster is at a Web site.

3. The method of claim 1, further including dynamically reallocating workload from source IP addresses from node to node resulting from changes to said sum of imbalance metrics as workload source IP addresses allocated to said cluster changes.

4. The method of claim 1, further including, responsive to newly allocating workload from a source IP address to a node in said cluster, determining the increase in the imbalance metric for said node by:
   squaring the distances of said newly allocated workload from a source IP address paired with each source IP address already allocated to said node;
   calculating the sum of all of said pairings for said node; and
   adding said calculated sum to the existing imbalance metric of the node.

5. The method of claim 4, wherein:
   responsive to a node in said cluster going off-line, said source IP address is being reallocated to one of the remaining nodes in the cluster;
   and further including:
   determining the increase in said imbalance metric resulting from the reallocating workload from said source IP address to each remaining node in said cluster; and
   reallocating workload from said IP address to the node with the least increase of its imbalance metric.

6. The method of claim 1, further including, responsive to removing workload from a source IP address from a node in said cluster, determining the decrease in the imbalance metric for said node by:
   squaring the distances of said source IP address of said removed workload paired with each remaining source IP address allocated to said node;
   calculating the sum of all of said pairings for said node; and
   decreasing said calculated sum from the existing imbalance metric of the node.

7. The method of claim 6, further including reallocating the removed workload to another node in said cluster comprising:
   determining the increase in said imbalance metric resulting from the reallocating said removed workload of said source IP address to each remaining node in said cluster; and
   reallocating said workload of said source IP address to the node with the least increase of its imbalance metric with respect to the decrease in the imbalance metric of the node from which said workload is being removed.

* * * * *